INVENTORS
FRANK BEVILACQUA
CHRISTOFFEL H. MEIJER
BY John F. Carney
ATTORNEY

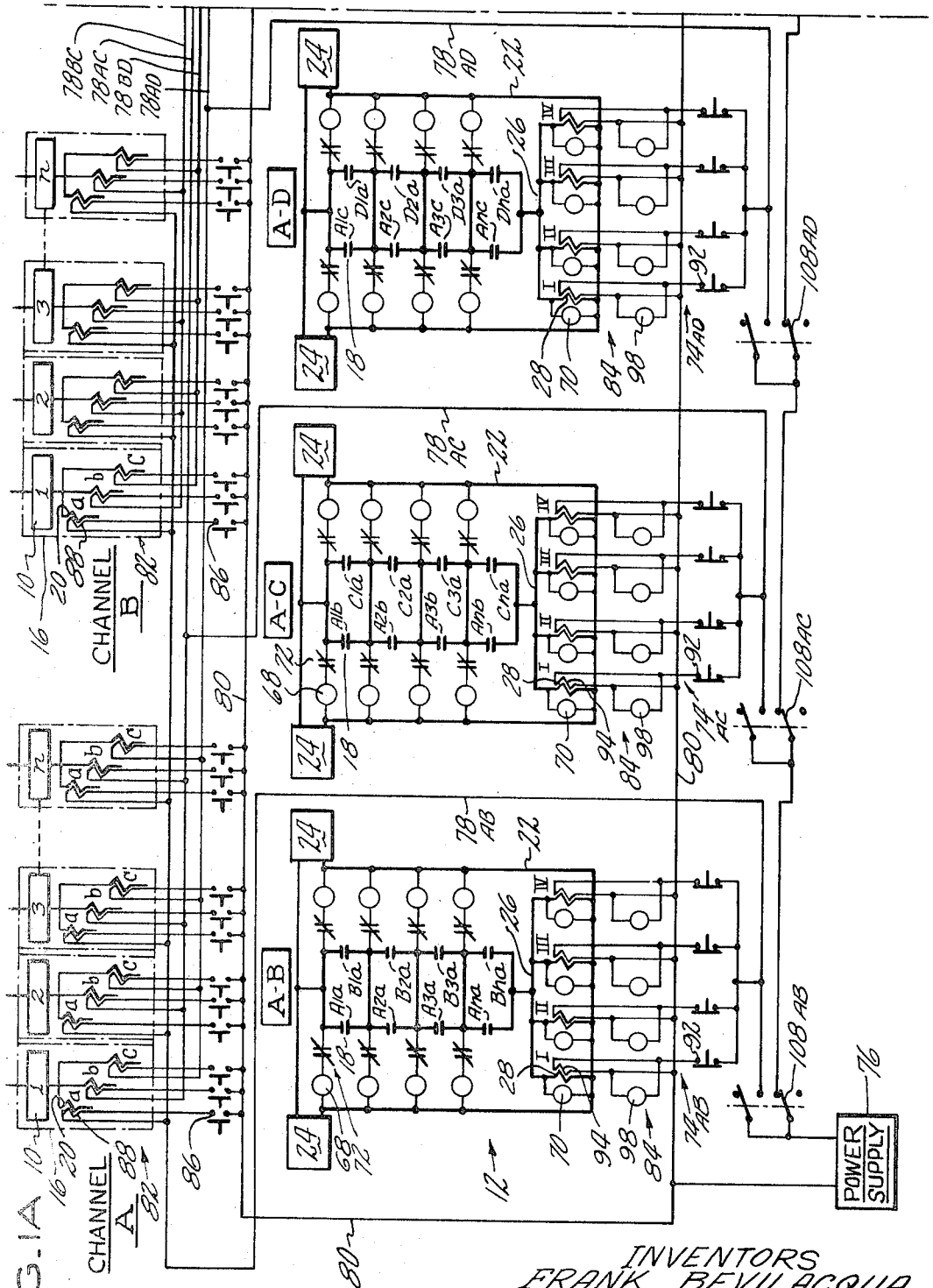

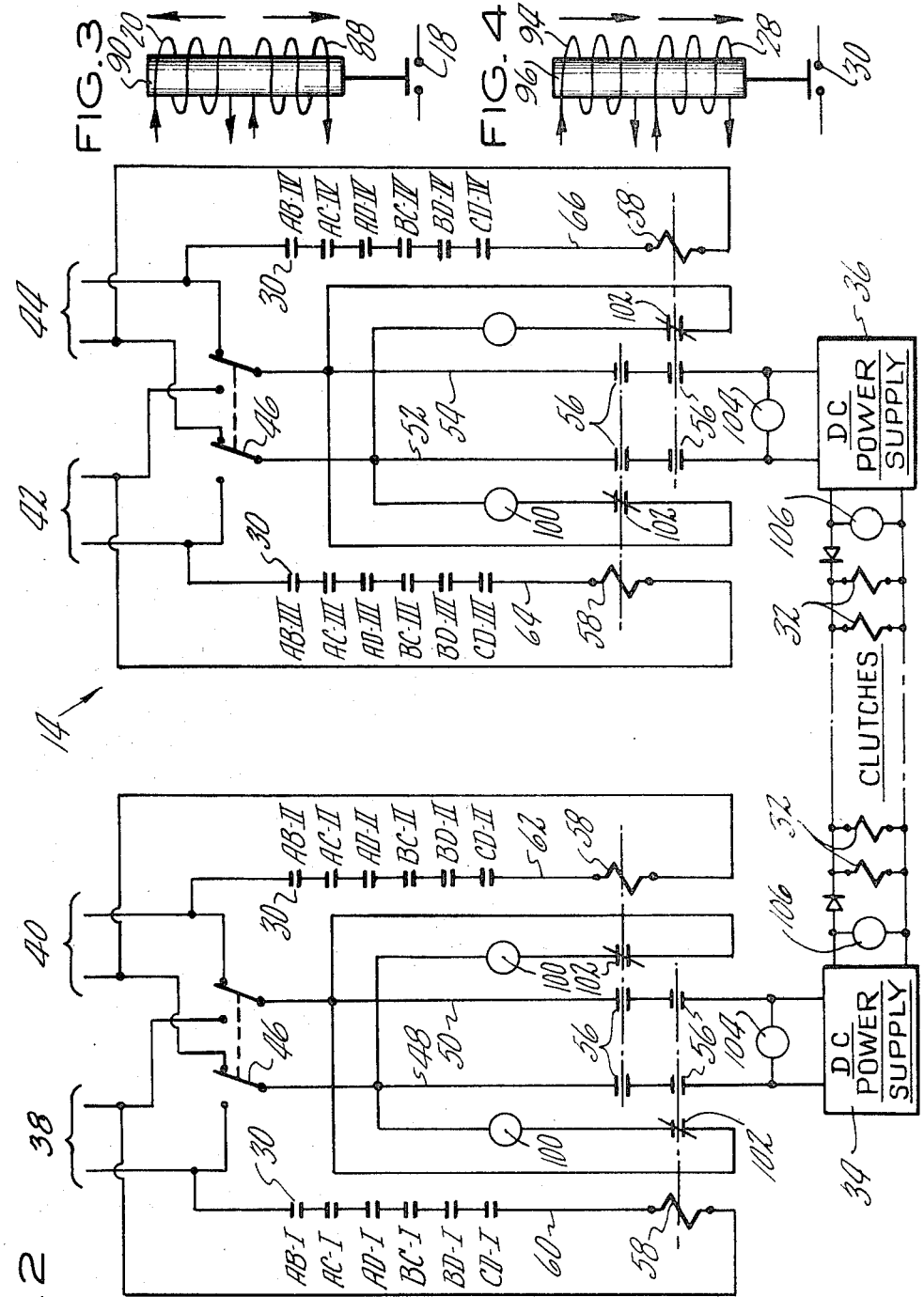

United States Patent Office 3,437,556
Patented Apr. 8, 1969

3,437,556
TEST CIRCUIT FOR REACTOR SAFETY
CONTROL SYSTEM
Frank Bevilacqua and Christoffel H. Meijer, Windsor,
Conn., assignors to Combustion Engineering Inc.,
Windsor, Conn., a corporation of Delaware
Filed Oct. 23, 1967, Ser. No. 677,109
Int. Cl. G21c 7/36, 7/00; H02h 7/00
U.S. Cl. 176—19                                    5 Claims

ABSTRACT OF THE DISCLOSURE

A test circuit for determining the operability of various components of a nuclear power plant safety control system wherein the actuating relays of the control system are provided with double coils, one being operative in the circuitry of the control system and the other operative in the test circuit whereby the actuation of the control system can be simulated by a test circuit that is completely isolated from the circuitry of the control system. The circuitry of the test system is so arranged that testing of the control system can be conducted while the safety control system remains operative.

Background of the invention

It is imperative, in order to prevent accidents of calamitous proportions, to provide nuclear power plants with safety control systems that are capable of immediately responding to deviations from safe operation of the plant and to terminate reactor operation whenever such deviations occur. Such systems must contain a high degree of reliability and must be so designed as to be operative whenever the power plant is in operation. One such safety control system is as shown and described in copending application Ser. No. 667,908 to Frank Bevilacqua for "Nuclear Power Plant Protective System."

It is well known that such safety control systems must be periodically checked to determine the state of operation of its component parts such that repair or replacement can be made where needed. Heretofore known systems or circuits for determining the operation of automatic control systems have required that the function provided by the control system be suspended while testing of the system is carried out. Such systems or circuits cannot be employed in nuclear power plants due to the need for continuous plant supervision. Test systems that permit continuous operation of the safety control systems heretofore known are operative only at a significant expense to the reliability of the control system involving the removal from service of individual elements of the latter and replacement with like elements. Such systems are both cumbersome and expensive. Yet another form of test system incorporates elements that are integral with the control system and have their operation superimposed on that of the latter in order to maintain continuous supervision of plant operation. This type of test system is undesirable due to the fact that by integrating additional elements into a control system the chance of system failure due to component malfunction is increased.

In order to remedy such deficiencies in safety control test systems the present invention provides a system that permits continuous supervision of all of the operating variables of a nuclear power plant while testing of the control system is conducted. Moreover, the arrangement is such that the component parts of the test system are completely isolated from the control system thereby preventing suspension of operation of the latter due to failure of a component part of the former.

Summary of the invention

According to the present invention a circuit is provided for testing the operability of a nuclear power plant safety control system having a plurality of sensing devices for monitoring each of a number of plant operating variables, which devices are operable through switching elements to actuate contacts in a plurality of parallelly-related matrices, the latter being effective to produce a termination of reactor operation whenever more than one of the sensing devices monitoring the same operating variable manifest an indication of the presence of an unsafe operating condition. The test circuit incorporates means for isolating only one matrix at a time for testing and for simulating an unsafe plant condition in the isolated portion of the safety control system such that that portion of the control system can be effectively tested for operability while the remaining matrices continue to be operable in the control system. Relays that provide command signals to the matrices from the sensing devices and others that provide a control rod scram controller with command signals from the matrices are formed as double coil relays, one coil being operative in the circuitry of the control system and the other being operative in the circuitry of the test system thus permitting control system actuation to be simulated by test circuitry that is completely isolated from that of the control system.

Brief description of the drawings

FIGURE 1a is a schematic diagram of sensing apparatus operative in a nuclear reactor safety control system and a portion of the test system according to the present invention that is associated with this apparatus;

FIGURE 2 is a schematic diagram of a control rod scram controller operative in the safety control systems of FIGURES 1a and 1b;

FIGURE 3 is a schematic representation of one form of double coil relay employed in the present invention; and FIGURE 4 is a schematic representation of another form of double coil relay employed in the present invention.

Description of the preferred embodiment

Figure 1B:
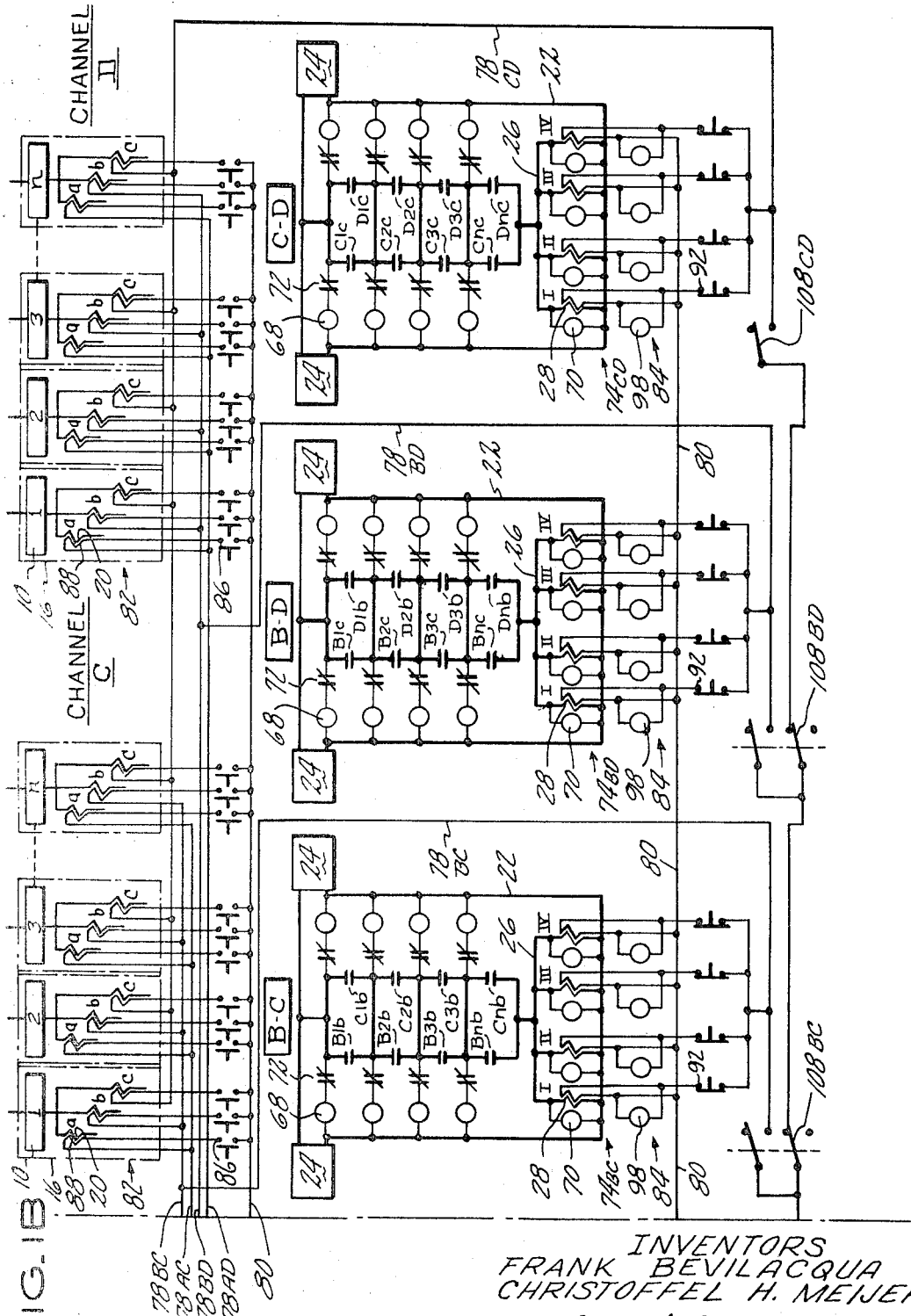
FIGURE 1b is a continuation of FIGURE 1a and embodies a schematic diagram of the control circuit employed in conjunction with the apparatus of FIGURE 1a together with the test system associated therewith.

The nuclear power plant safety control system illustrated in the drawings provides a continuous monitoring of each of several operating variables of the plant and termination of reactor operation whenever any of the variables manifests the existence of a condition that is determined to be detrimental to safe plant operation. Some of the variables that typically may be monitored are primary coolant flow, fluid pressure in the pressurizer, water level in the vapor generator, absence of load, condition of neutron flux, etc. A complete description of the safety control system of the instant type is contained in U.S. patent application Ser. No. 667,908 to Frank Bevilacqua for "Nuclear Power Plant Protective System." A detailed description of the safety control system will not be repeated here except insofar as is required for an understanding of the test circuit embodied in this application.

The safety control system in the illustrated embodiment comprises four sensing devices 10 for monitoring each of the several operating variables of the plant and is adapted to terminate operation of the nuclear reactor whenever any two of the four devices indicates the presence of an unsafe condition. The sensing devices 10 are operative through a control circuit 12 to actuate a control rod scram controller 14, the latter being effective to release all of the control rods operative in the reactor such that they drop to their fully inserted position within the reactor core to thus terminate reactor operation. The organization of the control circuit 12, being such that this trip action can occur only when at least two of the four sensing devices monitoring each variable are simultaneously actuated, prevents the occurrence of needless plant shutdowns due to single component malfunction or spurious actuation.

As shown in FIGURE 1, the sensing devices 10 are grouped into each of four channels 16 identified by uppercase letters A, B, C, and D, resectively. Each channel 16 contains a group of sensing devices 10 with each group comprising one sensing device for monitoring each of the respective variables. In the illustration, each sensing device 10 is identified by the variable that it monitors with the respective variables being indicated by a single digit number 1, 2, 3 . . . n. For example, those sensing devices that monitor low primary coolant flow are designated as "1;" those that monitor high pressure coolant flow as "2;" and those monitoring low fluid pressure in the pressurizer as "3." It should be understood that any number of variables can be monitored under the disclosed arrangement and this is represented by the presence of sensing devices 10 identified as "n."

While the form of each of the sensing devices varies, depending upon the particular variable that it monitors, each is provided with a plurality of relay coil-contact sets comprising a contact 18 and its associated operating coil 20. In the figure, the contact 18 appears in the control circuit 12 while its associated operating coil is depicted in close proximity to the respective sensing devices. The number of coil-contact sets employed with each sensing device 10 depends upon the number of contacts 20 required in the control circuit 12. Since the system illustrated employs two-out-of-four logic, each sensing device 10 requires three coil-contact sets, identified by lowercase letters $a$, $b$, and $c$, respectively.

The contacts 18 that are operative in each coil-contact set are normally open contacts that are closed by energization of its associated coil 20 whenever the plant is placed in operation. The contacts 18 will thus be actuated to their open position by deenergization of their associated coil 20 when the sensing device with which it is operative responds to a predetermined condition in the variable being monitored.

The control circuit 12 of the disclosed safety control system comprises six parallelly-related matrices 22, each being connected between two independent power sources 24. Each of the matrices 22 consists of a series-parallel connection of paired contacts 18 which are connected in series with a relay group 26, the latter, in the disclosed arrangement, comprising four redundant coil-contact sets consisting of coils 28 operable to actuate an associated contact 30 in the control rod scram controller 14 of FIGURE 2. Each of the six matrices 22 are identified by combinations of upper-case letters corresponding to the channel 16 with which their constituent contacts 18 are associated. The matrices 22 are thus identified as AB, AC, AD, BC, BD, and CD, respectively, with matrices AB for example consisting of a series connection of parallelly connected contact pairs from channels A and B. The contacts in this matrix, therefore, include those identified as A1$a$, B1$a$, A2$a$, B2$a$, A3$a$, B3$a$ . . . A$na$ and B$na$, the respective contacts bearing a designation that identifies the particular channel, sensing device, and relay coil with which each is associated. Similar designations are applied to the respective contacts 18 in the remaining matrices 22.

It should be evident that, by means of the disclosed circuitry, the coils 28 in the respective relay groups 26 will remain energized to maintain the reactor in operation as long as none of the paired contacts 18 in the respective matrices 22 is simultaneously actuated to an open position. Should any two sensing devices 10 monitoring the same operating variable be caused to actuate its associated contacts 18 by deenergizing the associated coils 20, current flow through the affected matrix 22 will cease, thereby deenergizing the coils 28 in the appropriate relay group 26 to thus open the associated contact or contacts 30 in the control rod scram controller 14. This action will effect termination of operation of the reactor as hereinafter set forth.

The operation of the scram control 14 is such that whenever one or more matrices 22 are actuated to deenergize the coils 28 in the affected relay group or groups 26, one or more of the contacts 30 will open. Because the controller 14 comprises in effect four parallelly-connected circuits, any two of which can be operated at one time, operation of the reactor can be terminated through either of the operating circuits, thereby increasing the reliability of the system. The clutches will release the control rods when the clutch coils 32 are deenergized as will occur when either of the relay coils 58 are deenergized to open their respective contacts 56.

According to the present invention, means are provided to test the operation of the above-described safety control system in a manner that eliminates the need to remove the control system from service while the test is being conducted. Means comprising a test circuit are here illustrated in FIGURES 1$a$ and 1$b$ in lines lighter than those that depict the circuitry of the control system. The test circuit includes various switches, relay coils, and indicating lights, or the like, so arranged as to provide an indication of the operability of the various components and circuitry that make up the control system.

As shown in the drawings, the matrices 22 of the control system are each provided with various indicating lights or the like, 68 and 70, respectively. Lights 68 are connected in parallel with each of the contacts 18 that comprises the matrices 22 and are provided with switching contacts 72 that are arranged to close whenever the associated matrix contact 18 is open. Thus, each of the indicating lights 68 will be lighted whenever its associated contact 18 is actuated to an open position. Lights 70 are connected in parallel across each of the coils 28 that make up the respective relay groups 26 and are arranged to be lighted whenever the associated coil is energized. These lights, being positively connected into the circuitry of the safety control system, serve to provide a continuous indication of the state of operability of the contacts 18 and relay coils 28. They are also functional in the test circuit of the present invention, as hereinafter described, to provide an indication of the operability of their associated control system components and circuitry.

The test circuit of the invention comprises a plurality of subcircuits 74 that are connected in parallel across a source 76 of electrical energy that is independent from the energy sources employed in the control system. As the description of the test circuit proceeds, like elements will be designated by like numerals but appended with a lettered designation appropriate to the component part of the control system set with which each is associated. Each subcircuit 74 is associated with each of the respective matrices 22 that comprise the control system and each functions to determine the operability of the related matrix and its component elements. Thus the six subcircuits 74 that are operative in the described arrangement bear designations $74_{AB}$, $74_{AC}$, $74_{AD}$, $74_{BC}$, $74_{BD}$, and $74_{CD}$, respectively, to indicate the matrix with which each is associated.

Each subcircuit 74 includes a live lead 78 containing various circuit elements which all connect to a common ground lead 80 from the energy source 76. These circuit elements can be set up arranged in two parallelly connected portions, one indicated as the matrix contact portion 82 and the other as the matrix relay portion 84. The matrix contact portion 82 of each subcircuit 74 comprises a plurality of parallelly-connected lines each containing a manually operated, normally open switching contact 86 and a relay coil 88 adapted to be energized when its associated contact 86 is closed. The coils 88 are each associated with one of the coils 28 that are operated by the various sensing devices 10 of the control system. The coils 88 contained in each subcircuit 74 are those provided with the respective coils 28 that operate the contacts 18 in the matrix 22 associated with the respective subcircuits. Thus the matrix contact portion 82 in subcircuit $74_{AB}$ contains lines connected between live lines $78_{AB}$ and ground lines 80 having coils 88 that are operatively associated with the various coils 28 in channel A, which coils are responsible for the actuation of contacts A1a, A2a, A3a . . . Ana in the matrix AB and also with coils 28 in channel B responsible for the actuation of contacts B1a, B2a, B3a . . . Bna in that matrix. The matrix contact portion 82 of the remaining subcircuits 74 is similarly composed with that of subcircuit $74_{AC}$ including coils 88 that are associated with the relay coils 28 in channel A responsible for actuation of contacts A1b, A2b, A3b . . . Anb and those in channel C that actuate contacts C1a, C2a, C3a . . . Cna in the same matrix, etc.

Each coil 88 is adapted to operate the same armature of the respective relay as the coil 20. It is so arranged, however, as to actuate the armature and thus its associated contact in the direction opposite from that of the coil 20. Moreover, the amount of magnetomotive force generated by the coils 88 will be substantially equal to, or greater than, that of the associated coil 20 such that the coils 20 need not be deenergized while tests are being conducted. A typical arrangement of the actuating relays employed in the preferred embodiment of the invention is illustrated schematically in FIGURE 3. As shown, the relay comprises an armature 90 having a switching element adapted to open or close contact 18. Around the armature 90 are wound the two coils 20 and 88 whose respective windings and direction of current flow are such that when coil 20 is energized, the armature 90 will be urged downwardly to hold contact 18 closed. But when coil 88 is energized, its M.M.F. being greater than that of coil 20, the armature 90 will be urged upwardly to open contact 18.

The matrix relay portion 84 of each subcircuit 74 comprises a parallel connection of lines, each containing a manually operated, normally closed switching contact 92 connected in series with a relay coil 94. One such line is operatively associated with each of the coils 28 that serve the relay groups 26 of the associated matrix 22. Thus, the matrix relay portion 84 of subcircuit $74_{AB}$ contains lines connected between live lead $78_{AB}$ and ground line 80 having coils 94 associated with each of coils 28 that comprise the relay group 26 of matrix AB. The coils 94 are each adapted to supplement the action of their associated coil 28 and are operative to maintain the contact 30 closed when coils 28 are deenergized during one portion of the test procedure. Armature 96 possesses a switching element adapted to open or close contact 30. Around the armature 96 are wound two coils 28 and 94 each having sufficient M.M.F. to independently operate the armature to hold the contact 30 closed.

In addition to the lights 68 and 70, other lights designated as 98, 100, 104 and 106 are included in the system to provide indications of the occurrence of other steps in the system. The lights 98 are connected in parallel across each of the coils 94 and each is lighted when its associated coil is energized. These lights, when lighted, indicate that the contacts 30 associated with the respective coils 28 will remain closed when the latter are deenergized during the test procedure. Lights 100 are disposed in each of lines 48, 50, 52 and 54 of the control rod scram controller 14 (FIGURE 2) and are operated by contacts 102. Contacts 102 are actuated by the relay coils 58 in the lines 60, 62, 64 and 66 but are of opposite sense from the circuit breaking contacts 56. They are therefore closed when the contacts 56 are open to light the lights 100 when the relays 58 are deenergized and the contacts 56 are open. A pair of lights 104 are connected in parallel across each of the pairs of lines, 48 and 50, and 52 and 54. These lights are associated with each of the D.C. sources 34 and 36 and are lighted as long as alternating current from the sources 38 and 44 is supplied to the respective D.C. sources. Extinguishment of these lights, as should occur when the contacts 56 open, is an indication that the respective D.C. sources 34 and 36 are, in fact, deenergized Another pair of lights 106 are associated with the respective D.C. sources, 34 and 36. These lights are connected in parallel across the lines that contain the clutch coils 32 and provided an indication, when lighted, that the associated D.C. source is supplying current to energize the coils. Alternatively, extinguishment of the respective lights, provides an indication that its associated D.C. source is deenergized and therefore incapable of supplying power to the coils 32 as when a trip of that source has occurred.

The operation of the herein described test circuit is as follows. Each of the lead lines 78 that emanate from the test circuit power supply 76 and thus provide the respective subcircuits with electrical energy contains an independent, manually actuated test actuation switch 108. The switches 108 are normally open switches which, as shown, together with the lines 78, are so connected in the circuit that power can be supplied to only one subcircuit at a time. Actuation of any switch 108 removes its associated matrix 22 and related elements from operation in the safety control system but the remaining matrices, here five in number, continue to function as intended. Thus the control system can remain in operation while tests are conducted with only a minor concomitant reduction in system reliability.

Testing of the system is conducted in two phases, a matrix test and a scram control test. The matrix test is intended to prove the operability of the components of the system that are related to the respective matrices 22. These components include the armatures 90 that are operated by the relay coils 20, the contacts 18 and the relay coils 28. The scram control test is intended to prove the operability of the various components that operate in the control rod scram controller 14. These include the armatures 96 operated by relay coils 28, their associated contacts 30, relay coils 58 and their contacts 56. This phase of testing is also effective to detect the presence of short circuits in lines 48 through 54 and between the D.C. sources 34 and 36 and the clutch coils 32. By means of this test circuit the entire safety control system between the sensing devices 10 and the control rod clutches can be tested for operability to determine that a trip of the nuclear reactor will occur when operating conditions so require.

Going now to the matrix test, one of the matrices 22 is selected for testing. Assuming it is the matrix AB, the test actuation switch $108_{AB}$ is depressed thereby supplying current to line $78_{AB}$ which energizes, through the normally closed switches 92, the four relay coils 94 associated with the armatures 96 operated by coils 28 in the relay group 26 of matrix AB. Energizing the coils 94 prevents the opening of contacts 30 designated as AB–I, AB–II, AB–III and AB–IV in lines 60 through 66 of the scram controller 14 by holding the armature 96 closed when the coil 28 is later deenergized during the test procedure. Illumination of lights 98 indicates that the coils 94 are energized and the test can proceed without danger of effecting a reactor trip.

When the test actuation switch $108_{AB}$ is depressed current is also passed through line $78_{AB}$ to the open switches 86 that operate coils 88 associated with relays 20 designated A1a, A2a, A3a, Ana, B1a, B2a, B3a and Bna. Thereafter each of the switches 86 associated with these relays can be sequentially closed to energize the coils 88 and thereby cause the associated contacts 18 in matrix AB to open. When the respective contacts 18 are opened their associated switching contacts 72 are closed to energize the respective indicating lights 68 thereby providing an indication that the respective contacts 18 will open when their associated coils 20 are energized. Preferably this portion of the test procedure is conducted by depressing switches 86 that operate pairs of contacts 18 in the matrix. Thus the switches 86 associated with relays A1a and B1a, A2a and B2a, etc., are simultaneously depressed in paired sequence. The illumination of lights 68 will indicate that the associated contacts 18 and at the same time the extinguishment of lights 70 as each pair of switches 86 is depressed will indicate that the coils 28 in the relay group 26 of matrix AB will be deenergized when each contact pair is actuated to an open position. By means of this phase of the test procedure a determination of the operability of the safety control system related to matrix AB from the relays 20 to the relay coils 28 can be made.

After all of the pairs of matrix contacts 18 have been tested the scram control test is initiated. This phase of the test procedure is conducted by maintaining one or more pairs of the switches 86 in their closed position and thereafter actuating the four switches 92 associated with the respective relays I, II, III and IV to an open position in sequence. By maintaining the switches 86 associated with a pair of sensing devices closed a simulated trip condition is imposed upon the matrix and, except for the energization of the coils 94 and the circuit arrangement of the scram controller 14 as hereafter explained, the trip signal could be passed to the clutch coils 32. As each switch 92 is manually actuated to its open position its associated coil 94 is deenergized and, since the relay coil 28 is deenergized, the related contact 30, designated AB–I, AB–II, AB–III or AB–IV, in the scram controller 14 will open to deenergize relay coil 58 and opening contacts 56 in one half of the controller circuitry. An actual reactor trip will be prevented due to the fact that one contact 30 in each half of the circuitry must be simultaneously actuated for such to occur. With the relay 58 associated with the affected contact 30 deenergized the contacts 56 in lines 48 and 50 or 52 and 54 will open and contact 102 will close to illuminate light 100 thereby indicating that the relay 58 has been deenergized. At the same time lights 104 and 106 in the affected half of the controller 14 will be extinguished, the former indicating that the contacts 56 have opened and the latter indicating that the power supply 34 or 36 has been deenergized. This procedure is repeated until all of the relays I, II, III and IV in the matrix AB have been similarly tested. Thereafter the procedure for the entire matrix is repeated for the remaining matrices AC, AD, BC, BD and CD until operability of the entire safety control system has been determined.

It should be evident that by means of the hereindisclosed test circuit a nuclear reactor safety control system of the instant type can be effectively tested for operability without materially detracting from the system's protective reliability while the test is being conducted. It will be noted that by providing means whereby each matrix 22 of the control system can be independently tested only that matrix to be tested need be removed from service while the others remain fully operable. Only one relay element from each sensing device 10 in the affected channels 16 is rendered inoperable during test thereby leaving the remaining two fully operable such that no channel need be completely removed from service.

The instant test circuit arrangement also provides for complete isolation of the test system from the safety control system thereby providing for higher reliability in the control system. Because none of the elements active in the test system are incorporated integrally into the control system there is less chance of control system malfunction. Furthermore, this arrangement insures that any short circuiting or the like in the test system will not affect the safety control system.

It will be understood that the various changes in the details, materials, and arrangements of parts which have been herein described and illustrated in order to explain the nature of the invention, may be made by those skilled in the art within the principle and scope of the invention as expressed in the appended claims.

What is claimed is:

1. In an electrical control system operative to produce a desired effect in response to sensing means responding to a predetermined condition in at least one monitored operating variable and including:
    means to produce the desired effect;
    sensing means for monitoring at least one operating variable;
    first relay means including an energizable coil operated by said sensing means in response to the presence of a predetermined condition in said operating variable;
    electrical matrix circuit means containing a series-parallel connection of contacts actuated by said first relay means and arranged to emit a command signal to produce the desired effect according to a predetermined logic sequence;
    second relay means including an energizable coil operatively associated with said matrix circuit means to be actuated upon the occurrence of the actuation of said contacts according to said predetermined logic sequence, said second relay means having means to actuate said desired effect producing means;
the improvement comprising test means operative to determine the operability of said control circuit by simulating the occurrence of said predetermined condition, said test means comprising:
    an electrical circuit containing a normally open actuation switch;
    first coil means operatively associated with said first relay means in overriding relation with the coil thereof;
    normally open switch means connected in series with said first coil means and operative to energize said first coil means to actuate said contacts according to said predetermined sequence;
    second coil means connected in parallel with said first coil means and its associated switch means and operatively associated with said second relay means in overriding relation with the coil thereof;
    normally closed switch means connected in series with said second coil means and operative to energize said second coil means to prevent actuation of said desired effect producing means upon actaution of said second relay means;
    and sensible indicating means operatively associated with said contacts and said relay means to indicate the actuation thereof.

2. Apparatus as recited in claim 1 the improvement comprising said relay means each including a contact-operating armature and a pair of coils each effective to operate said armature, one of said coils being operative in the circuitry of said control system and the other being operative in said test circuit.

3. Apparatus as recited in claim 2 the improvement comprising said first relay means including a pair of coils, one of which is operative in said test circuit and effective, when energized, to operate said armature in a direction opposite to that produced by energization of said other coil and said second relay means includes a pair of coils, one of which is operative in said test circuit and effective, when energized, to operate said armature in the same direction as that produced by energization of said other coil.

4. In a nuclear reactor safety control system operative to terminate reactor operation upon the occurrence of sensing means responding to a predetermined condition in any of a number of plant operating variables, said control system including:
    electrically operated means for terminating reactor operation;
    a plurality of sensing devices for monitoring each of a plurality of independent plant operating variables and being arranged in mutually isolated channels each containing a group of sensing devices consisting of one for monitoring each of said operating variables;

a plurality of first relays associated with each of said sensing devices each including an energizable coil operated by said sensing devices in response to the presence of a predetermined condition in said operating variables;

a plurality of parallelly-related matrices, each containing a series-parallel arrangement of contacts actuated by said first relays and arranged to emit a command signal to actuate said reactor operation terminating means;

and a plurality of second relays, each including an energizable coil associated with each of said matrices to be actuated upon the occurrence of the actuation of said matrix contacts according to a predetermined logic sequence, said second relays each being operative through contacts to actuate said reactor operation terminating means;

the improvement comprising a test circuit operative to determine the operability of said control system by simulating the occurrence of said predetermined condition, said test circuit comprising:

a plurality of subcircuits, each associated with one of said matrices and each including:
a first portion containing a plurality of coils each being operative to actuate the contacts operated by said first relays and a normally open switch for actuating each of said coils in sequence;
a second portion in parallel with said first portion containing a plurality of coils, each being operative to operate the contacts associated with one of said second relays when the coil of the latter is deenergized;
an actuation switch means operable to actuate only one of said subcircuits at a time.

5. Apparatus as recited in claim 4 the improvement comprising said first and second relays being double-coil relays having one coil operative in said control system, the other coil of said first relay being operative in said first subcircuit portion and effective, when energized, to actuate the armature of said relay in a direction opposite to that produced by energization of said one coil and the other coil of said second relay, when energized, being effective to hold the armature of said relay when said one coil is deenergized.

References Cited

UNITED STATES PATENTS 2,973,458    2/1961    Nye _____ 317—31

OTHER REFERENCES

A.E.C. Document AECL-799 (1959) pp. 7-3 to 7-5 (part of an article by G. C. Laurence).

Journal of British Nuclear Energy Soc. pp. 74-76, January 1963, part of an article by A. H. Weaving et al.

Nuclear Safety, June 1961, vol. 2, No. 4, pp. 16, 17.

Control Engineering, vol. 9, No. 5, May 1962, pp. 89–93 Hill et al.

REUBIN EPSTEIN, *Primary Examiner.*

U.S. Cl. X.R.

176—20; 317—9